(12) United States Patent
Biesse

(10) Patent No.: US 8,881,784 B2
(45) Date of Patent: Nov. 11, 2014

(54) UNPUNCTURABLE INNER TUBE

(76) Inventor: Philippe Biesse, Bellegarde (FR)

( * ) Notice: Subject to any disclaimer, the term of this patent is extended or adjusted under 35 U.S.C. 154(b) by 1632 days.

(21) Appl. No.: 11/912,879

(22) PCT Filed: Apr. 19, 2006

(86) PCT No.: PCT/FR2006/000904
§ 371 (c)(1),
(2), (4) Date: Jul. 1, 2008

(87) PCT Pub. No.: WO2006/114504
PCT Pub. Date: Nov. 2, 2006

(65) Prior Publication Data
US 2008/0257470 A1  Oct. 23, 2008

(30) Foreign Application Priority Data
Apr. 27, 2005 (FR) ..................... 05 04336

(51) Int. Cl.
*B60C 5/02* (2006.01)
*B29D 23/24* (2006.01)

(52) U.S. Cl.
USPC ......... 152/510; 152/511; 428/34.1; 428/35.7; 428/36.8

(58) Field of Classification Search
USPC ................. 152/344.1; 428/34.1, 35.7, 36.8
See application file for complete search history.

(56) References Cited

U.S. PATENT DOCUMENTS

| | | | | |
|---|---|---|---|---|
| 532,879 A | * | 1/1895 | Humphreys | 152/341.1 |
| 804,701 A | * | 11/1905 | Bigger | 152/341.1 |
| 925,580 A | * | 6/1909 | Keiffer | 152/341.1 |
| 1,420,081 A | * | 6/1922 | Dirienzo | 152/341.1 |
| 1,431,540 A | * | 10/1922 | Osgood | 152/341.1 |
| 2,253,230 A | * | 8/1941 | Feldman | 152/338.1 |
| 3,616,831 A | * | 11/1971 | Lafuente | 152/342.1 |
| 4,884,609 A | * | 12/1989 | Ho | 152/337.1 |
| 5,180,455 A | * | 1/1993 | Cheng | 152/338.1 |
| 6,896,020 B1 | * | 5/2005 | Summers | 152/334.1 |
| 2003/0019553 A1 | | 1/2003 | Yun et al. | |
| 2005/0051249 A1 | | 3/2005 | Lee | |

FOREIGN PATENT DOCUMENTS

| | | |
|---|---|---|
| CH | 509 173 A | 6/1971 |
| DE | 102 32 066 A1 | 2/2004 |
| FR | 639 721 A | 6/1928 |
| FR | 2 457 778 A1 | 12/1980 |
| FR | 2 720 336 A | 12/1995 |
| WO | WO 99/54154 A | 10/1999 |
| WO | WO 2005/018920 A | 3/2005 |

* cited by examiner

*Primary Examiner* — Justin Fischer

(57) ABSTRACT

The invention relates to a device for inserting inside tires of a vehicle so that it follows its course without stopping after a bursting. The device comprises a cluster of flexible bladders (1) which are made of rubber, have a diameter of one to several inches according to the use, are interconnected by a cord (2.1) with its distribution branches (2.2, 2.3) and an inflating stem (3). The air enters each bladder via the cord by means of a very sensitive mini-check valve (9). During inflation, the air contained inside the space of the tire is purged via a purging system (6, 7, 8). In one variant, the principle of the valves, cord and purge is retained, but there are fewer bladders and they have the shape of sections of the tire. Bladders that are resistant to depression can also be used with the same valves and purge but without a cord. The refilling ensues by an over inflation step followed by a reduction effected by the purge until the operating pressure is reached. Finally, one or several rings of multiple or single chambers can be used that are inflated to a pressure greater than the tire and mounted inside around the wheel.

11 Claims, 13 Drawing Sheets

UNPUNCTURABLE INNER TUBE

TECHNICAL FIELD

The invention relates to a system that allows a tires bearing vehicle, whether it is a regular car, an all tracks vehicle, a truck, an agricultural machinery, an armoured vehicle, or other, with two, three, four or more wheels, continue its way without having to repair immediately even in case of a very severe puncture.

BACKGROUND ART

This type of situation is usually managed through the use of tires with run flat technology for the newer luxury vehicles, the use of rubber filled tires for heavy transportation or handling machines or other techniques for armoured vehicles.

The largest drawback in these solutions is the limitation of speed and distance the vehicle can run after a puncture and also for a transportation vehicle the limitation of load it can handle. For what concerns filled tires, even if they are very effective against punctures, the level of driving comfort, the rotation inertia of the wheels and the limitation of speed and vibrations caused by the stiffness of filled rubber, practically limit its use to handling gears.

These devices require an adaptation or a change of the pre-existing rims and tires of the vehicle. Some technology requires a complete replacement of the set when the limit of distance is reached after the initial puncture, as the material is not reusable after it has exceeded its limit. Some of these other technologies are better suited for low profile tires (small height over width ratio) than for high or regular size tires. After the puncture, the rotation of the wheel of the same axle operates on different effective diameters, making the differential gear work continuously. The flat tire no longer has any lateral support and cannot contribute in the lateral control of the vehicle.

Finally it's costly to keep in store optimal equipment for each type of road (dry, rugged, snow etc.). Drivers in countries with marked climate changes still use specific types of tires that they change according to the season or the road. They thus need a system of unpuncturable tires for each type of road.

DISCLOSURE OF THE INVENTION

The device as outlined by this invention offers a solution for the above stated drawbacks. It consists of inserting a cluster of independent bladders of the air chamber type, tight under pressure of inflating gas (air or of any other inflation gas) inside any type of standard tire whether it is tubeless or normally fitted with a tube, regular or low profile, designed for dry weather, snow or off road, for luxury or standard vehicle, for passenger cars or transport vehicles.

According to a primary arrangement, the system includes for each wheel a cluster of flexible rubber bladders (1) interconnected by a flexible cord (2), itself composed of a main cord (2.1), distribution branches (2.2, 2.3 and 2.4) and an inflation valve (3). In this description, the term rubber stands for all kinds of natural, synthetic, mono or poly components, blends of latex, butyl materials etc. belonging to the large family of rubbers.

The basic volume of each bladder and their initial distance are such that the so arranged set properly pressurized inside the tire will occupy entirely its volume and give it the necessary pressure for driving safely the vehicle according to the manufacturer recommendations.

In other words, the increase in volume of each bladder is initially limited by the presence of other ones and finally by the walls of the tire rather than by the tension of its own outside membrane (or walls). The bladder occupies an irregular volume that is slightly bigger than the volume of its spherical shape when it is under light pressure in regular conditions. The result of the excess volume is a slight lengthening (thus tension) of its membrane which is necessary to compensate for the variation in shape that the closed volume of the tire and its neighbouring bladders impose upon it to maintain the right pressure in the set of bladders whether they are located close to the central part of the rim or at periphery, to allow for a rapid and stable relocation of intact bladders after a puncture has occurred and to maintain the inflation valves perfectly tight. The value of this overpressure required to create the slight tension of the bladder membrane must be added according to a formula validated by the fire manufacturer to the value of the normally recommended inflation pressure.

Due to the rotational speed of the wheel the membranes of the bladders are subject to relatively important centrifugal effects that differ according to their thickness and to the position of the bladder within the tire. These effects generate an increase of pressure from the central rim to the periphery of the tire. The shape of the bladders, which is more or less cubic within the inflated tire when the car is stopped, will lengthen near the rim side and flatten on the peripheral inside surface of the tire. For extreme cases with a ratio of the speed over pressure being too big, (around 200 km/hour for 2 bars), there would be a concentration of the bladders onto the periphery of the tire. The excess of pressure would however be limited according to the structure and thickness of the membrane so that if the bladder were exposed atmospheric pressure it would still have an important potential of increase before a possible blast.

To give rough ideas, a bladder with reinforced membrane of diameter Do and volume Vo at atmospheric pressure would reach values such as Do+6% and Vo+20% at 2 bars and Do+12% and Vo+40% at 4 bars.

This stiffness also allows for a more homogenous increase in the volume of the bladders and a decrease in the overheating effects. Depending on the applications, less stiffness can also be adequate.

The diameter of the bladders is in the range of the inch, generally 1 to 2 inches for 2 wheels vehicle, 2 to 3 inches for cars and over 3 inches for trucks. The overlapping of these indicative zones and other values are possible according the applications. To give an idea, a tire 200 mm wide, with 100 mm side walls on a 16 inches wheel would hold around 2000 bladders of diameter 1 inch or 250 bladders of diameter 2 inches, for respectively 4 and 2 kg of rubber. A truck tire 275/70 R 22.5 would hold 1000 tennis balls (2.2 inches in diameter) or 60 handballs (about 6 inches in diameter).

The thickness of the membranes and their composition is a function of the weight, volume, stiffness to be reached but equally of the overheating caused by relative movements of the walls during deformations of the bladders.

The inlet of the air (nitrogen or another gas or mixture of gas) used for inflation is through a mini non-return valve (9) which is tight with very light pressure in the return direction between the bladder (1) and the branches of the cord (2). To achieve that, valves with butyl socks (9.3) wrapped around a blind tube (9.1) drilled with a small lateral hole (9.2) would preferably be used.

The initial tension of the butyl sock is at minimum in order to allow an easy gas inlet with low pressure and the laterally perforated tube will be light, for example made of plastic material (polyurethane . . . ). Metallic non-return valves will be avoided in regards to a possible opening due to centrifugal effects at high speed.

The cord (2) is composed of a number of primary branches (2.2), themselves divided into secondary branches (2.3) to form a bunch, all branches can have the same diameter, which in turn can be smaller than the main cord's (2.1).

The cord is flexible but rigid enough in its inside so that it does not get plugged when bent (that could occur during inflation if the cord has not been properly put into place) or when squeezed by the pressure developed by the bladders.

It is deployed around the rim, on the central side of the clusters and has a length slightly bigger than the rim circumference (5.2) so that there is no problem when mounting on the wheel.

It can be elastically extended. The primary and secondary branches, and the bladders are arranged to achieve approximately the ring shape of a regular tube.

The main cord (2.1) is fed by a feeding appendix called feeding branch (2.4) fitted with an inlet adaptor (3) for inflation.

This tip is put through the hole normally provided in the rim (5.5) for a regular tire inlet valve.

To allow good closure of the individual bladders valves, this appendix should not be tightly closed if the mini valves (9) have sensitivity to centrifugal effects.

During a puncture, the tire will be perforated in one or several points, by one or several small or big holes. The bladders located near the puncture will be punctured and will deflate or even burst. The ones located immediately next to them as well as the other ones will consequently occupy the new empty space, increasing individually in volume and decreasing in pressure, this decrease in pressure being extended to the whole tire.

This decrease will follow approximately the ratio of the remaining number of bladders over the initial number. There will be a tire unbalance due to a concentration of weight near the puncture in spite of the rearrangement of the bladders, this concentration will be limited by the friction between bladders and the increase in volume of individual bladders will be slightly bigger near the puncture (and the apparent tire pressure a little bit lighter). However, the tire will not be emptied and the vehicle will be able to continue its run.

In the case of big puncture, caused for instance by one or several bullets, driving on a spoke fence, the principle remain the same although the damages caused by the penetrating element concern a number of bladders inside the tire, and not simply located near the tire tread.

The two layers of walls of the punctured bladder will be squeezed near the hole and form a protection shield between the other bladders and possible broken wires of the tire structure, nails or pins that remain in the inside face of the tire tread.

Normally, the openings in the tire are not big enough to let the bladders out. A bigger diameter of bladders can be chosen according to the type of puncture feared in case bog holes are anticipated. In some cases, the use of a net around the bladders can be advantageous.

During inflation, the setting into position of the bladders will induce evacuation of the air initially included inside the tire, but once the tire beads are tight against the rim, and in particular for tubeless tires, this evacuation is no longer possible. The consequence is that quantity of air will be trapped between the bladders. This is not always a problem, however, in order to control this problem, it is possible to insert a small flat pipe (6) between the rim and the bead wires until this small flat pipe is pulled out or even destroyed once the target pressure is reached. This pipe is made of smooth steel or Teflon and its shape will follow the curve of the rim sides with a pulling strip and can be lubricated before use. An alternative solution is to use a venting hole (5.6) connecting the inner part of the rim groove to the outside atmosphere near a drain pipe (8) and its cap (7). This venting hole is located on the same diameter as the inlet valve hole (5) and next to it. In order to dismantle a tire after a puncture (or in absence of a puncture), it will be necessary to pierce a few bladders either with a needle through the puncture hole or in the space between the rim and the tire. This can be done by a dismantling machine (15 to 19) the will push the outside bead of the tire. The push stroke is around 40 mm till the rim inner groove. It is then possible to puncture the bladders. The next operation consists in inserting the tire lever and removing the first tire bead. The trend of the unpunctured bladders to pop out will have to be controlled.

According to a 2nd characteristic the clusters of bladders (1) will be replaced by the segments (10) of an air chamber that would be partitioned following radial planes. The segments generally numbering between 10 and 50 are connected by a cord (2.1) which follows a path close to the outer edge of the rim or the outer edge of the groove in the rim (in this case the cord will be elastic in order to be easily mounted) and each one has the same kind of valve (9) as described for the bladders of the 1st characteristic. This arrangement reduces the number of elements of the thus constituted multi-chamber. After a puncture the residual pressure will be statistically inferior to the one obtained with the bunches of bladders because of the larger percentage of punctured volume (around 1 section out of 20 as compared to a few bladders out of hundreds) over the total volume, but this will not very significant. However, this arrangement with radial sections is not adapted for the possibility of a puncture by a bullet going in the tire tangentially to the rim through many of these segments. This will not be recommended for armoured vehicles. In a similar way as for the clusters of bladders, the segments walls are subject to some overpressure conditions but to a lesser extend than the bladders due to their greater volume and of lower skin effects. They also have less friction between them and therefore less overheating and lower loss of efficiency in the tire. Their shape and dimensions are specific to the type, size and shape of the tire. The reduced number of elements induces a smaller quantity of rubber, a lower sensitivity to centrifugal effect and a lower cost.

Similarly to the clusters of bladders of the 1st arrangement, the venting system flat pipe type (6) or plug type (7) is to be used during inflation to purge the air trapped between the inside volume of the tire and the outside volume of the segments. The dismantling procedure of a tire after a puncture or without a puncture is similar to the one used for clusters in the 1st arrangement with the destruction of some segments.

According to a 3rd characteristic, the bladders (1) are replaced by balls (11) that are no longer linked by an air distribution cord. They have a semi rigid structure that allows them to keep their nominal volume while the outside pressure is a few grams of water column higher than the pressure inside the ball. These few grams are sufficient to let the gas go inside the ball through the valve (9). Conversely, the valves are immediately tight in the opposite direction.

The structure can be created in different ways through an adequate choice of structure, materials and thickness of the membrane of the walls (for example, diagram 11.1 shows a wall of around 1 mm for a ball of 1 inch diameter in a type of rather hard rubber reinforced with nylon fibres). To give a practical idea, a regular tennis ball with a 60 mm diameter and a 4 to 5 mm rubber wall thickness resists approximately 0.2 bars of negative pressure (vacuum).

In this arrangement, a definite number of non inflated balls (in fact they contain air at Atmospheric pressure, i.e. 0 bar of gage pressure but around 1 bar absolute pressure), or balls inflated to a few grams of effective pressure, will be introduced into the tire when it is mounted on the rim, the inner tire bead being inside the rim and the outside bead being on the outside of the rim.

At the end of the operation, the volume occupied by the balls will represent about 80% of the total inside volume of the tire. The bead wire of the 2nd tire bead will then be mounted and the tubeless type tire will be inflated slowly up to a pressure set at around 30-40% above the nominal pressure.

The balls will slowly be filled with gas at this pressure. After a period of stabilisation, it will then suffice to rapidly deflate the tire that will reach the final equivalent pressure desired. Due to their inside overpressure, the balls will increase in size and fill the entire volume of the tire by pushing out the intercellular gas until the equilibrium pressure/volume is reached. The balls and the small amount of remaining intercellular gas will push the tire beads tight against the rim edges and will then insure air tightness and tire road holding.

In case of a puncture, the gas from a few damaged balls (and the residual intercellular gas) will escape, the others balls will then fill the liberated volume. The computation of the set inflation pressure is a function of the ratio of the volume of occupancy of the balls in the tire (given by a table: number and size of the balls introduced/volume of the type of tire), the ratio of absolute pressures between the set inflation pressure and the final pressure, tension of the ball walls and the targeted ball expansion.

The dismantling procedure is similar to the one of the 1st arrangement. It should be noted that when the outside tire bead is extracted from the dismantling machine, balls could pop out of the tire.

According to a 4th characteristic, the balls (11) of the 3rd arrangement are built with an inside reinforcement structure (11.1, 11.2). This structure allows maintaining the spherical shape when there is a slight underpressure (vacuum) without increasing too much the thickness of the walls and the weight of the balls (11). The range of underpressure to control is from 0.05 to 0.1 bar, depending on the valve (9) opening pressure that is generally inferior to 0.04 bars. This reinforcing structure also partially limits the ball expansion during inflation to set pressure.

According to a 5th characteristic, the bladders (1) and balls (11) of the 1st and 3rd arrangement and possibly segments (10) of the 2nd arrangement are built with fibre canvas around their rubber wall membrane. The weaving of the canvas/bandage will follow latitude and longitude patterns made with zigzagging threads. With this configuration, the direction of the fibres will allow the bladder to easily increase in dimension within the two directions of its surface and thus increase its volume until the zigzagging threads have become straight. A limit to the expansion of the bladders is thus obtained which prevents the bladders (or balls) to explode successively if the ratio of emptiness in the tire becomes too large. The canvases also help increase the rigidity of the balls for underpressure.

According to a 6th characteristic, the bladders (1) and balls (11) of the 1st and 3rd arrangements and possibly segments (10) from the 2nd arrangement are assembled in a net (20) made up of mesh of a small dimension, about 1 centimeter by 1 centimeter, out of fibre and connected by knots. This prevents balls from escaping if the puncture leaves a large opening in the tire, and it maintains the bladders' walls facing the opening to avoid the formation of a hernia. Owing to the porous ness of its fibres and of its knots, it drains the air during the venting of the tire. When it is filled with clusters, balls, and segments it allows the test and commercial delivery of a complete system and finally it contains the balls for the safety of the personnel during the dismantling phase. The nets customised for each tire size include the required number of balls and have the adequate shape. The control of advised set pressures is thus made easier.

According to a 7th characteristic, the bladders of the 1st arrangement are replaced by a ring (12) that fills only a part of the inside volume of the tire. The ring is made of a rubber type material and includes 2 ring zones (12.1 and 12.2) composed of a succession of partitioned chambers. The chambers of the outside (higher) ring (12) are located in quincunx in relation to those of the inside (lower) ring (12.2) and are slightly longer (in the ratio of mean radiuses of the rings). The inside ring (12.2) inside surface has more or less the cylindrical (conical) shape of the rim groove (5.4) while the shape of the higher ring (12.1) is a semi-ring. The double wall between the higher and lower rings will be more or less cylindrical. The partitions (or cells) are linked together by a cord (2.1) and are individually equipped with a valve (9) similar to the one described in the 1st arrangement. However, these valves do not have the same constraints regarding minimal opening pressure and minimum components weight.

The principle behind this arrangement is to put the tire on the rim with this special ring on the inside. The operation resembles the normal assembly of a tubeless tire, and in order to do this, the ring (12) has at the time of assembly a diameter greater than the one at the edge of the rim so that it can be introduced around it without any damage to its reinforcing wires (12.3). These wires maintain a stable circumference and contain the volume expansion of the ring when pressure is exerted and with the help of the bandages give it its final shape.

Because the inflation pressure of the ring is rather important and that the tire doesn't help contain the volume of the ring after a puncture, the reinforcing wires, the bandages and the thickness of the rubber walls will be consequent, quite close to the structure of a compressed air or fire hose. Once the inside tire bead is mounted on the rim and then the ring, the valve (3 or 13) is put into place before lightly inflating the ring to put it into place on the central groove of the rim. The process can then be checked and eased by putting the inside bead wire in contact with the ring to make sure it is parallel to the rim and at proper distance, inflate more the ring and then insert the outside tire bead inside the rim edge.

During inflation, the ring gets firmly in contact with the outside surface of the rim groove (5.4) and through construction its width fits the profile of the rim groove. Its length being bigger than the circumference of the groove, there will be slight folding on the inside circumference of the ring so that it is finally be brought back to the circumference of the groove. This is not bothersome and it can even be reduced according to the elastic characteristics of the material of the inner ring (a compromise between rubber and canvas. The ring (12) is inflated at a pressure around 4 to 5 bars through its valve (13 or 3b) and takes its maximum volume.

The tire is then inflated through the 2nd valve (13 or 3b) at its service pressure generally around 2 bars. During this phase, the ring will slightly decrease in volume (resulting from the reduction of differential pressure inside/outside of the ring which is brought from 4 bars to 2 bars), but will remain sufficiently rigid and in contact with the rim to avoid creating an unbalance and a decrease in the tire's performance.

The valve (diagram 13) passed through the hole designed for this purpose in the rim will thus have two nozzles, one for the ring and one for the tire. The dimension of the two nozzles placed side by side is smaller than the diameter of the hole. Alternatively, there will be a 2nd hole (5.5a) for the passage of the ring valve (3a). It is compulsory in both cases to let the air in and out of the tire through a small drain pipe (8) placed opposite the hole and also made to prevent a blockage caused by the inflation of the ring.

In case of a puncture, the air contained in the tire will escape and the tire tread will come onto the outside surface of the ring thus allowing the vehicle to follow its course at reduced speed without the need to stop.

The tire won't sustain heavy damages during this drive and in most cases can be used again. In case of a very serious puncture, it's also possible that some of the ring cells are damaged. The untouched cells will then insure the drive in spite of the existing unbalance. To dismantle the tire after a puncture, it is necessary to deflate the ring and take off the tire. To dismantle when the tire is not punctured, the tire will be first deflated before deflating the ring.

According to an 8th characteristic, two or several rings can be installed (12) alongside for very wide tires and heavy vehicles. The inflation pressure for each ring can be modified accordingly.

According to a 9th characteristic the ring or the rings will consist in only one cell (or chamber). This chamber has globally the shape of a torus, is inflated at a pressure of around 6 bars and has a stiff enough reinforced structure (similar to a compressed air or fire hose) developing however a big enough increase in volume to hold firmly on the rim groove at a pressure value over 4 bars. The bursting pressure value is above 10 bars. In principal, in the case of several mono cellular rings in parallel, a single ring should be able to ensure the carrying and driving function of the wheel.

According to a 10th characteristic, the valves (9) of the bladders (1), segments (10) and balls (11) of the 1st, 2nd, 3rd, 7th, and rings (12 and 14) of the 8th and 9th arrangement have a fuse element (for example 9.4) that can be dissolved. On an undamaged tire, the deflation process occurs when a dissolving gas is fed into the tire. This introduction is done through the valve (3.3a or 13) at a pressure higher than the inflation pressure and with small quantities, enough so that the fluid reaches several of the valves (9). The deflation will occur slowly through the exhaust and controlled by the wheel's valve after the necessary time required for the dissolution. This fluid will not alter the resistance of the kinds of rubber (latex, butyl etc.) used for the cells and tires.

According to an 11th characteristic, the bladders (1) the segments (10) and the balls (11) of the 1st, 2nd, 3rd arrangements, the rings (12 and 14) of the 7th, 8th, and 9th arrangements can be reused, even repaired to be reused. This operation is carried out only when followed by systematic controls. The bladders (1, 10 or 11) and rings (12 and 14) that are not punctured will be retrieved and emptied during disconnection of the cord and use of a hollow needle (syringe) forced through the rubber bottom part of the valve (9.4). This rubber part is prestressed inside the tube and will be closed tightly after the operation. The bladders will be reused with a new cord properly redone. The punctured bladders (1, 10 or 11) and rings (12 and 14) can also be repaired with patches.

According to a 12th characteristic, the bladders (1), segments (10) and balls (11) of the 1st, 2nd, and 3rd arrangements and the rings (12 and 14) of the 7th, 8th, and 9th arrangements are checked before their use according to some specific tests.

The valves (9) are tested for opening pressure and the air tightness before assembly in the bladders (1, 10, or 11) or in the rings (12 or 14). The bladders (1, 10 or 11) and rings (12 and 14) fitted with their valves (9) are tested for leakages at a test pressure of 50 grams of water column and going into a vacuum chamber at around −1 bar gage for several minutes. The bladders will inflate due to the vacuum in the chamber and leaking bladders will loose part of their air. After returning to atmospheric pressure, the bladders will be palpitated and leaking ones will be flattened. The variations in atmospheric pressure (which can reach almost 10% of the atmospheric pressure) will be taken into account during the test and the pre-inflation phase. For each lot manufactured, a sample is thoroughly tested to burst pressure. The validation of tests allows the manufacturers to adjust or to give a correspondence table between the original markings of the tire (letter or number moulded or engraved on the side of the tire indicating the range of vehicle speed) with markings corresponding to the use of one the systems of the invention.

According to a 13th characteristic, the pressures mentioned in the preceding arrangements are transposable according to the application. The values of pressure given as examples for car tires normally inflated at around 2 bars are to be adjusted for other normal pressure ranges. The thickness and structures of bladders (1), balls (11), segments (10), rings and tubes (12 and 14) will evolve consequently. In particular for trucks applications with normal pressures in the range of 6 bars.

According to a 14th characteristic, a special machine (15, 16,17,18,19) can be used for the dismantling of the tires. This machine consists of a flange (15) on which the wheel rests on its inside face (in relation to the vehicle), a press (16) that will push by stiffeners (18 and 19)) on two half jaws (17a and 17b) whose semi-circular shape allows to fit in between the rim edge (5.2) and the outside tire bead (4) on a diameter as close as possible to the nominal diameter of the wheel. Thus pushing with a resisting tire pressure of 2 bars on a crown 3 centimeters wide with a radius of four hundred millimeters, the required press thrust is around 750 kg. The stroke is 40 millimeters up to the rim groove. It is then possible to puncture the bladders (1,10 or 11) made accessible to reduce the apparent pressure inside the tire. The next step is to insert the tire lever and to extract the outside tire bead. The bladders that are still intact may pop out of the tire.

BRIEF DESCRIPTION OF THE DRAWINGS

Sheet No 1: Sectional View of a Tire According to the 1st Arrangement.

Sheet No 2: Details of Drains and Vents.

Figure 2:
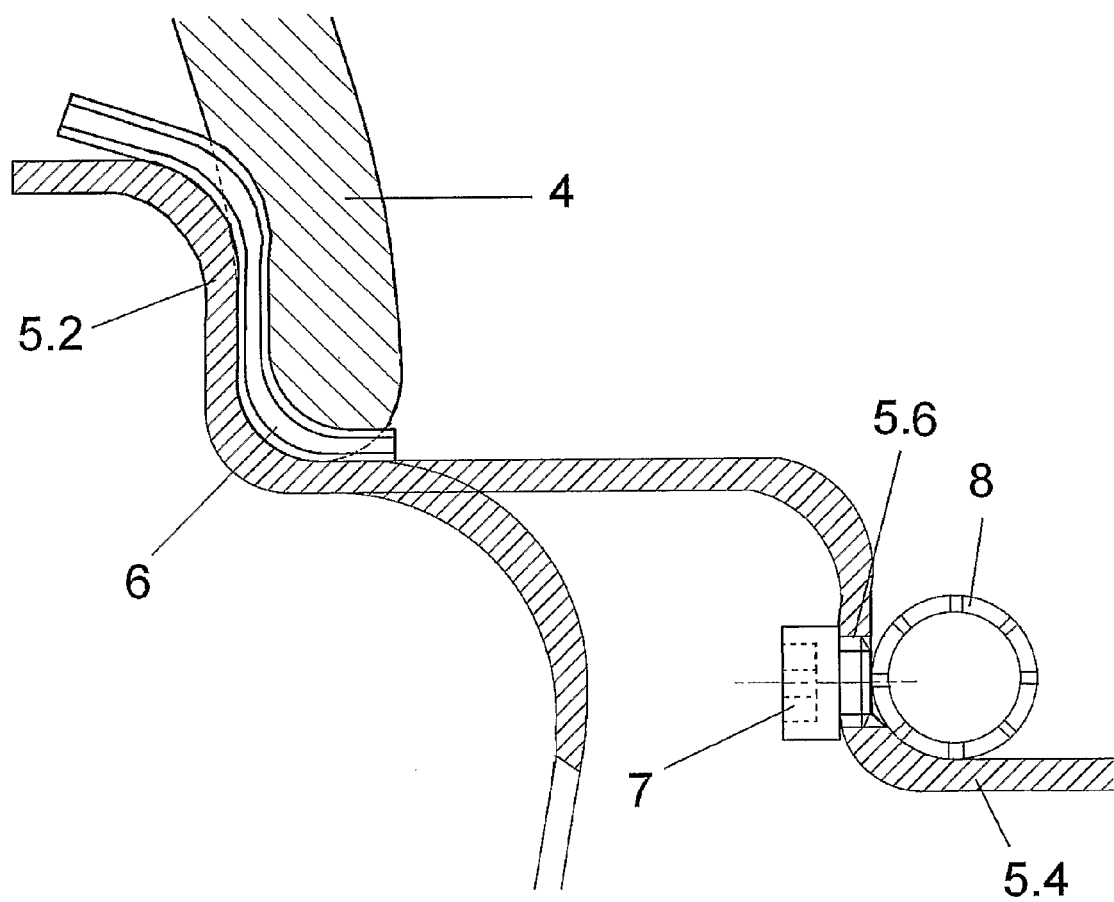

FIG. 2: a hole (5.6) is drilled and tapped in the rim cylinder (5.4) where the drain cap is screwed in from of the drain pipe (8). In a different configuration, a flat pipe (6) can also be used which is inserted between the wire (4) and the outside rim edge (5.2). The outside extremity of this flat pipe is bent away from the tire in order to ease the removal at the end of the inflation phase.

Sheet No 3: Details of a Cord Designed for 192 Bladders.

Figure 3:
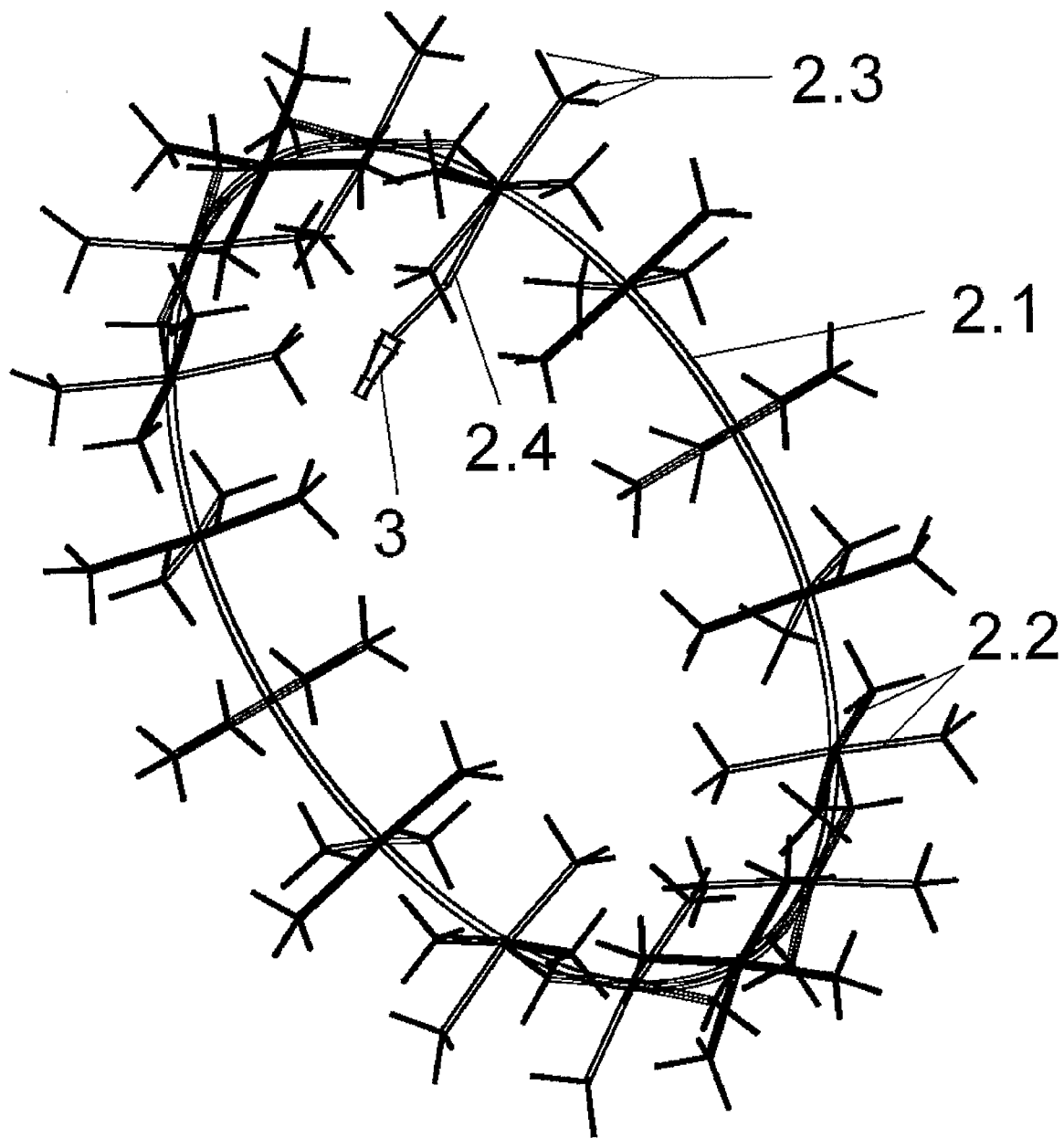

FIG. 3: the cord (2) according to the first arrangement shown without the bladders. The main cord (2.1) primary and secondary distribution branches (2.2 and 2.3), the feeding branch (2.4) and the valve (3).

Sheet No 4: Valve According to Arrangements No 1, 2, 3 and possibly No 4 to 14.

Figure 4:
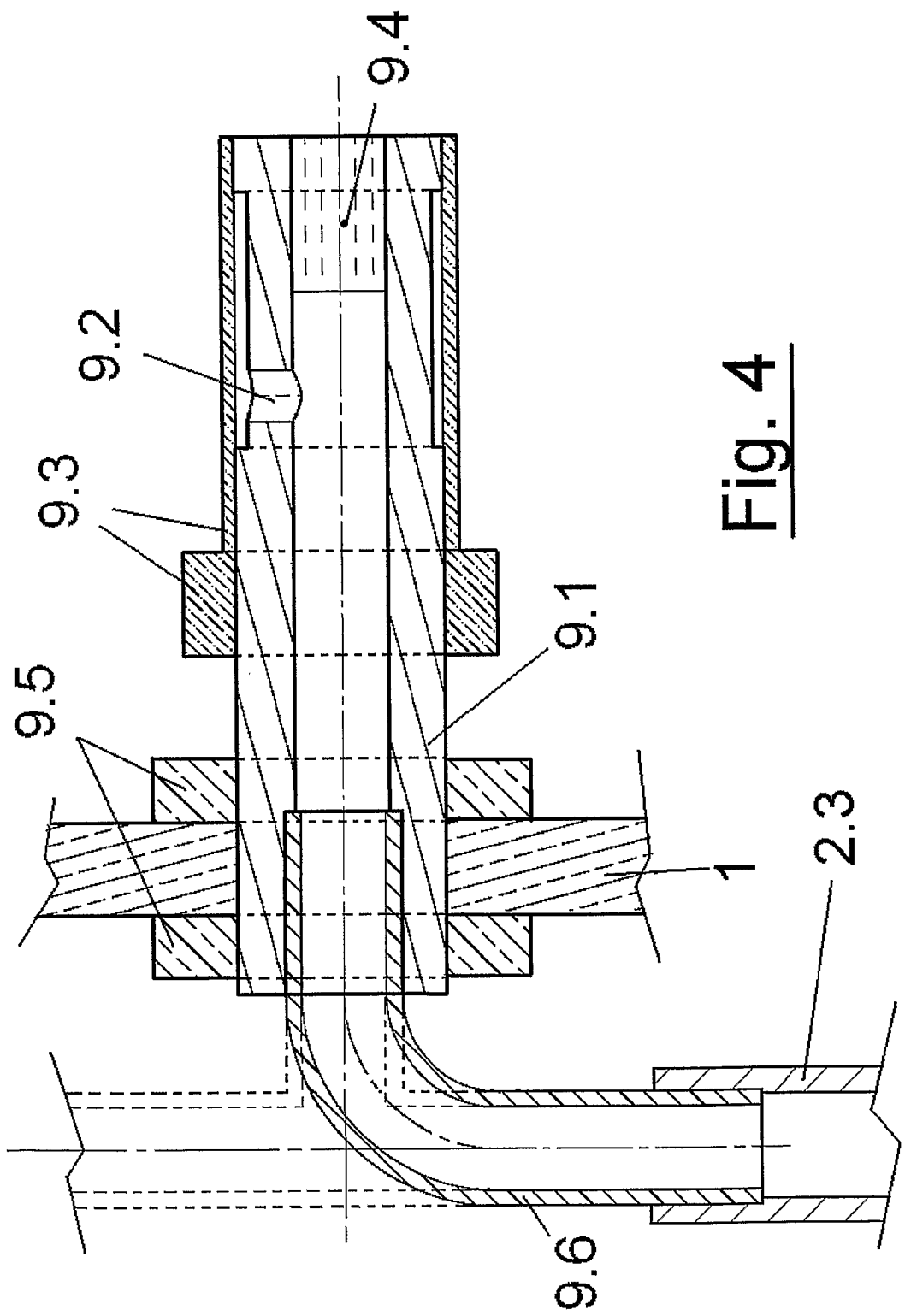

FIG. 4: the valve (9) consists of a main tube (9.1) with a wide and shallow groove drilled laterally (hole 9.2) and covered by a "sock" (9.3) made of a thin prestressed wall of butyl with a thicker part which ensures the grip onto the tube. The end of the tube (9.4) is plugged by an airtight filling substance that can even act as a fuse according to the 10th arrangement or that can be viscous and elastic according to the 11th arrangement. The wall of the bladder (1) is stuck and vulcanised between two elastic flanges (9.5). On the outer side the connector (9.6) joins tightly the valve to the secondary branch (2.3) of the cord. The connector (9.6) is bent or has a "T" shape depending on whether the branch continues beyond the valve or is the last one.

Sheet No 5: Bladders in the Shape of Segments According to the $2^{nd}$ Arrangement (Representation of a System which Shown Loose and Inflated with a Minimum Amount of Pressure).

Figure 5:
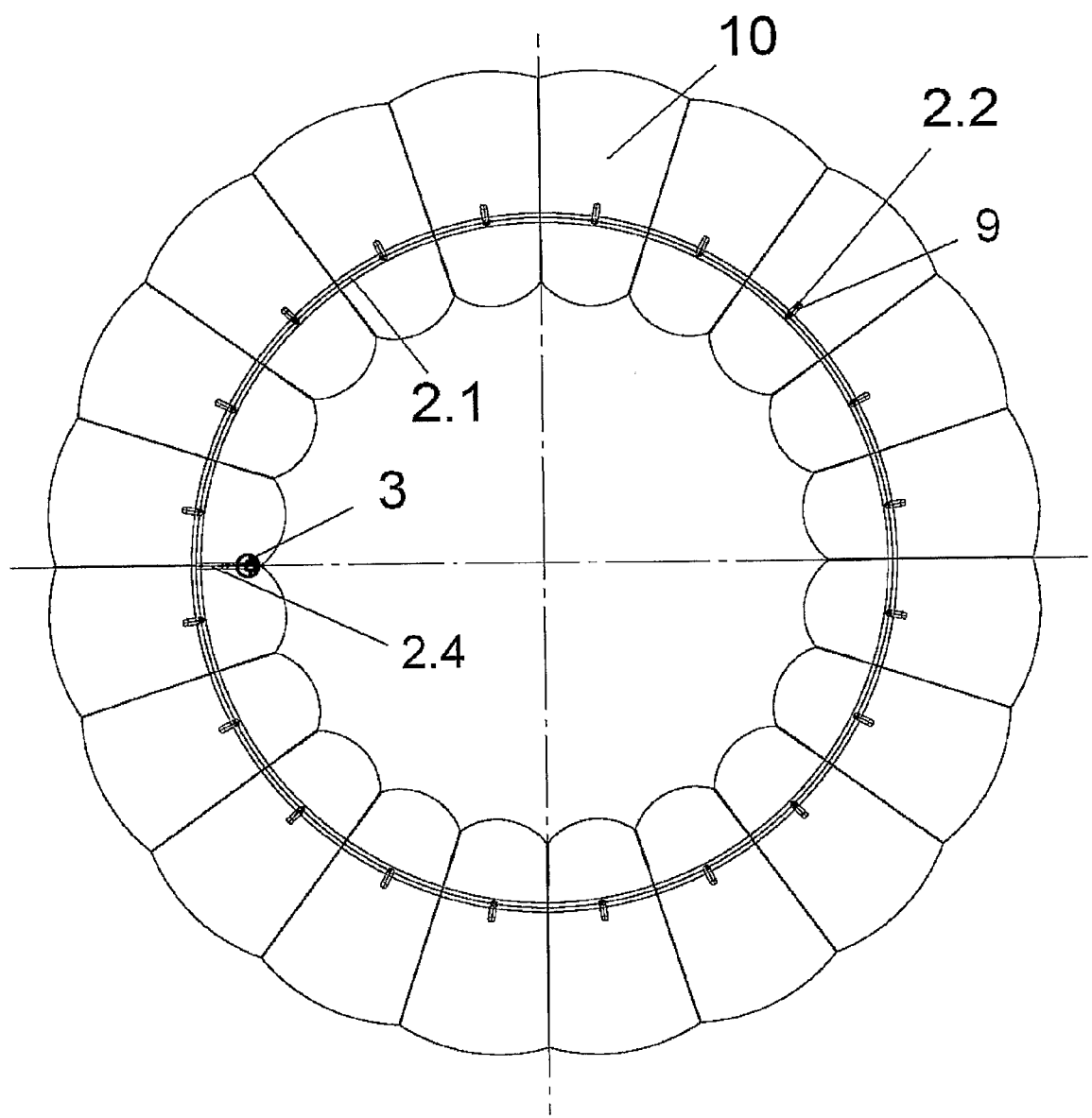

FIG. 5: the segments (10) follow each other to form a ring like set. The walls of the consecutive segments are placed side by side to form a double wall. The main cord (2.1) fed by the feeding branch (2.4) and the inflation valve (3) dispatches the air through the primary branches (2.2). These primary branches are very short or can be replaced by the "T" shaped connectors connected directly to the valves (9) of the segments.

Sheet No 6: Segments According to the 2nd Arrangement, Shown in a Radial Plane.

Figure 6:
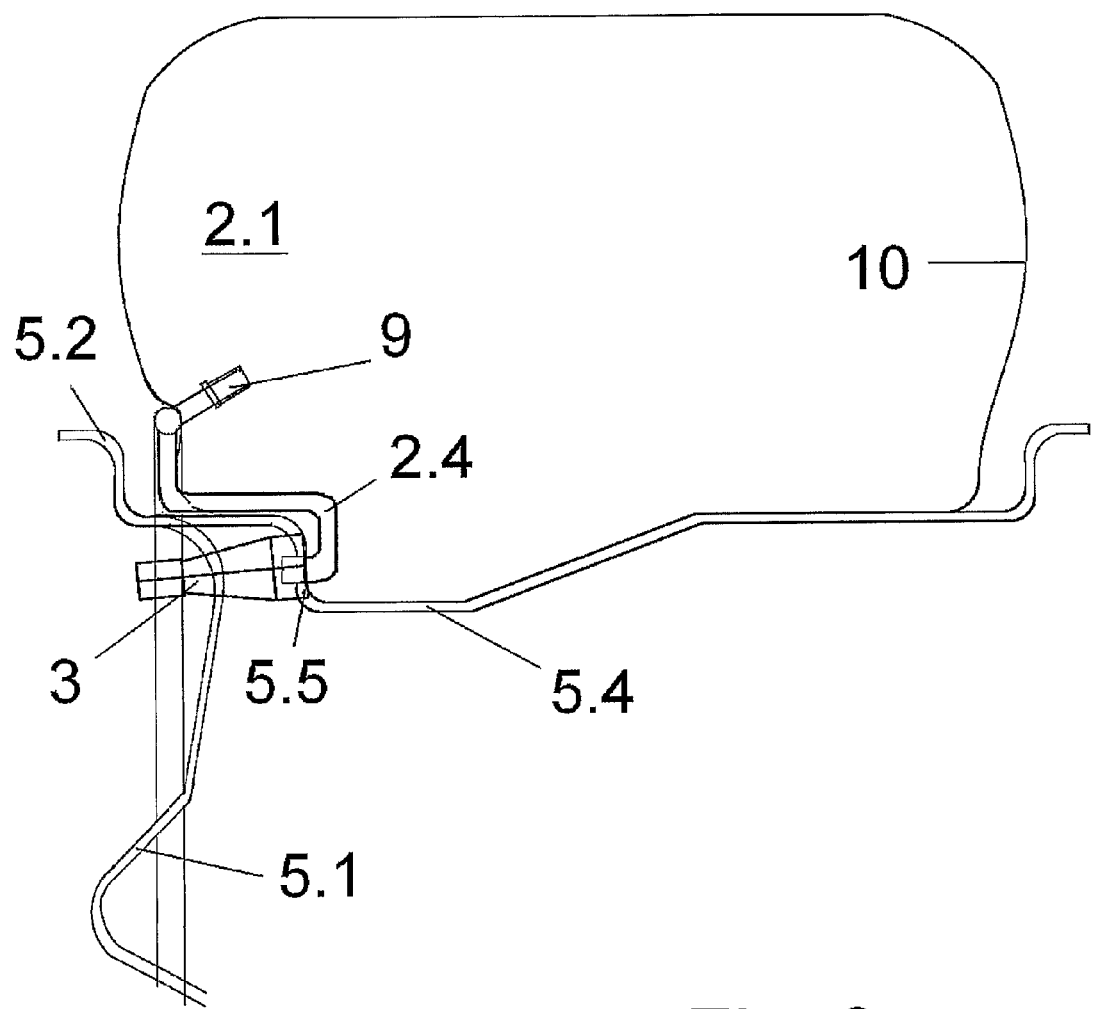

FIG. 6: the segment (10) takes on the inside shape of the tire. The inflation valve (3) is passed through the hole of the rim (5.5). The feeding branch (2.4) passed from the rim groove (5.4) towards the main cord (2.1) and then goes at the level of the outside rim edge (5.2) between the tire and the segment wall. The distribution branches (2.2) (or "Tees") are included in the liaison between the main cord (2.1) and the segments valves (9).

Sheet No 7: Bladders in a Ball Shape According to the 3rd Arrangement.

Figure 7:
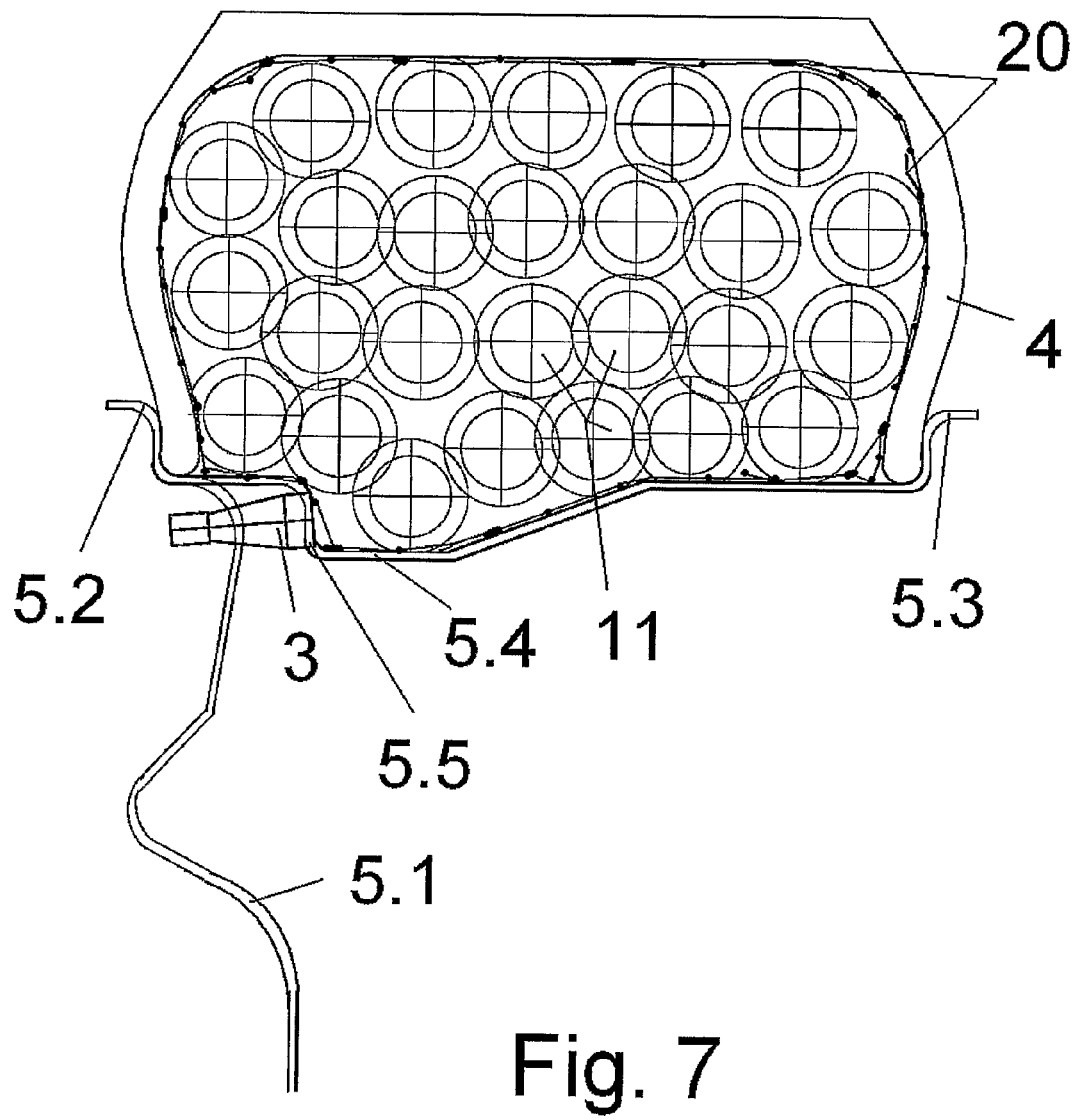

FIG. 7: the bladders/balls (11) are free in the annular space of the tire (4) mounted on the rim (5.4). They are included in a conditioning net (20) with the functions of drain and packaging. A regular valve (3) is passed through the rim hole (5.5). The tire is squeezed against the outside rim edge (5.2) and the inside rim edge (5.3) by the thrust developed by the balls. (5.1) is the rim web.

Sheet No 8: Inside Reinforcement of a Bladder/Ball According to Arrangement No 3 and 4.

Figure 8:
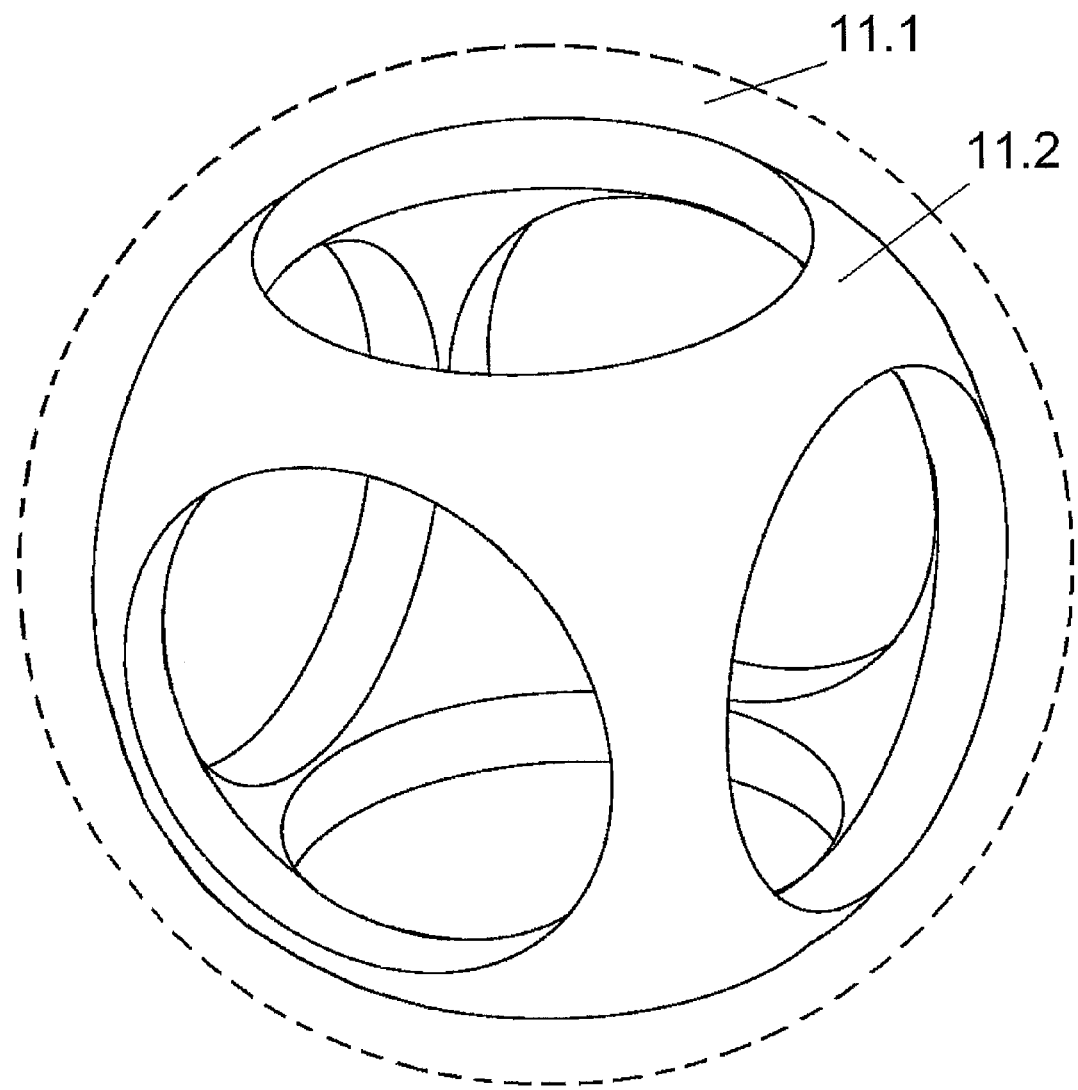

FIG. 8: the dotted lines represent the outside diameter (11.1) of the ball (11) which is fitted with 4 reinforcement structure (11.2) on it's inside wall, increasing its rigidity against underpressure (slight vacuum).

Sheet No 9: Multi-Chamber Rings Shown on a Radial Plane, and its Two-Entry Valve According to the 7th Arrangement.

Figure 9:
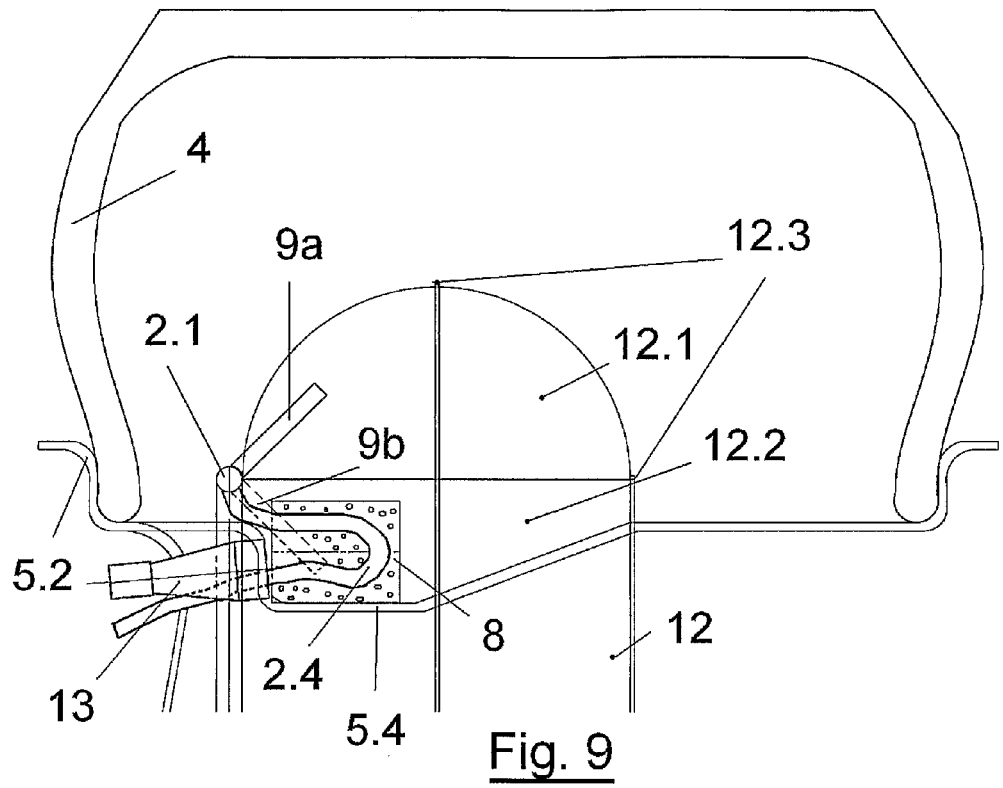

FIG. 9: Sectional view of the ring (12) located between the tire (4) and the rim groove (5.4) the inlet connector of double entry inflation valve (13) feeds the main cord (2.1) through its feeding branch (2.4). The former is long enough to ensure the blind passage of the valve (13) during the mounting and to pass through the nozzle of the drain pipe (8) in order not to be flattened by the lower chamber (12.2) of the ring. The drain also gives access to the annular space between the tire (4) and the rim cylinder (5.4) to the air delivered by the 2nd inlet connector of the valve (13) fitted on the rim hole (5.5) in order to inflate the tire. The main cord (2.1) distributes the air through the short primary branches or through the "T" shaped connectors (9.6) whose lined up branches ensure the continuity of the main cord (2.1). The lower chamber (12.2) of the ring (12) takes the shape of the rim groove (5.4). The reinforcing wires (12.3) and the bandages of the walls/membranes help maintaining the shape of the ring in spite of its inner pressure.

Figure 10:
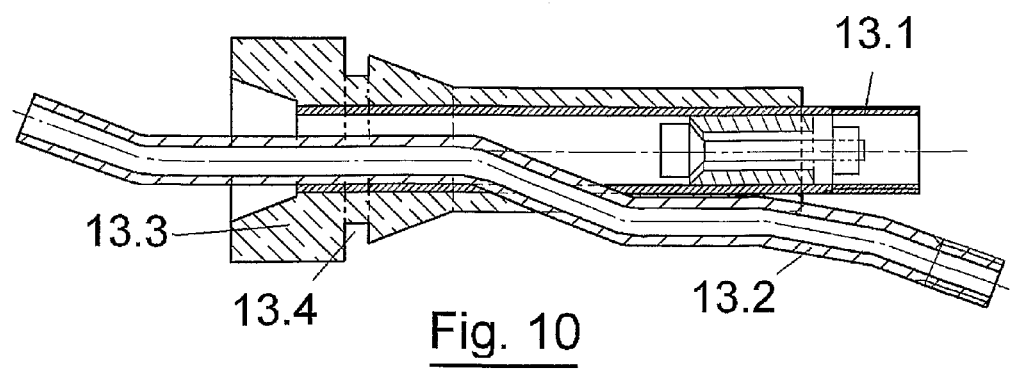

FIG. 10: Inflation valve with two air entries with tire inflation inlet connector (13.1) and ring inflation inlet connector (13.2). The rubber part cast around the valve fittings (13.3) has a groove (13.4) for the airtight passage through the rim hole (5.5).

Sheet No 10: an Isolated Ring.

Figure 11:
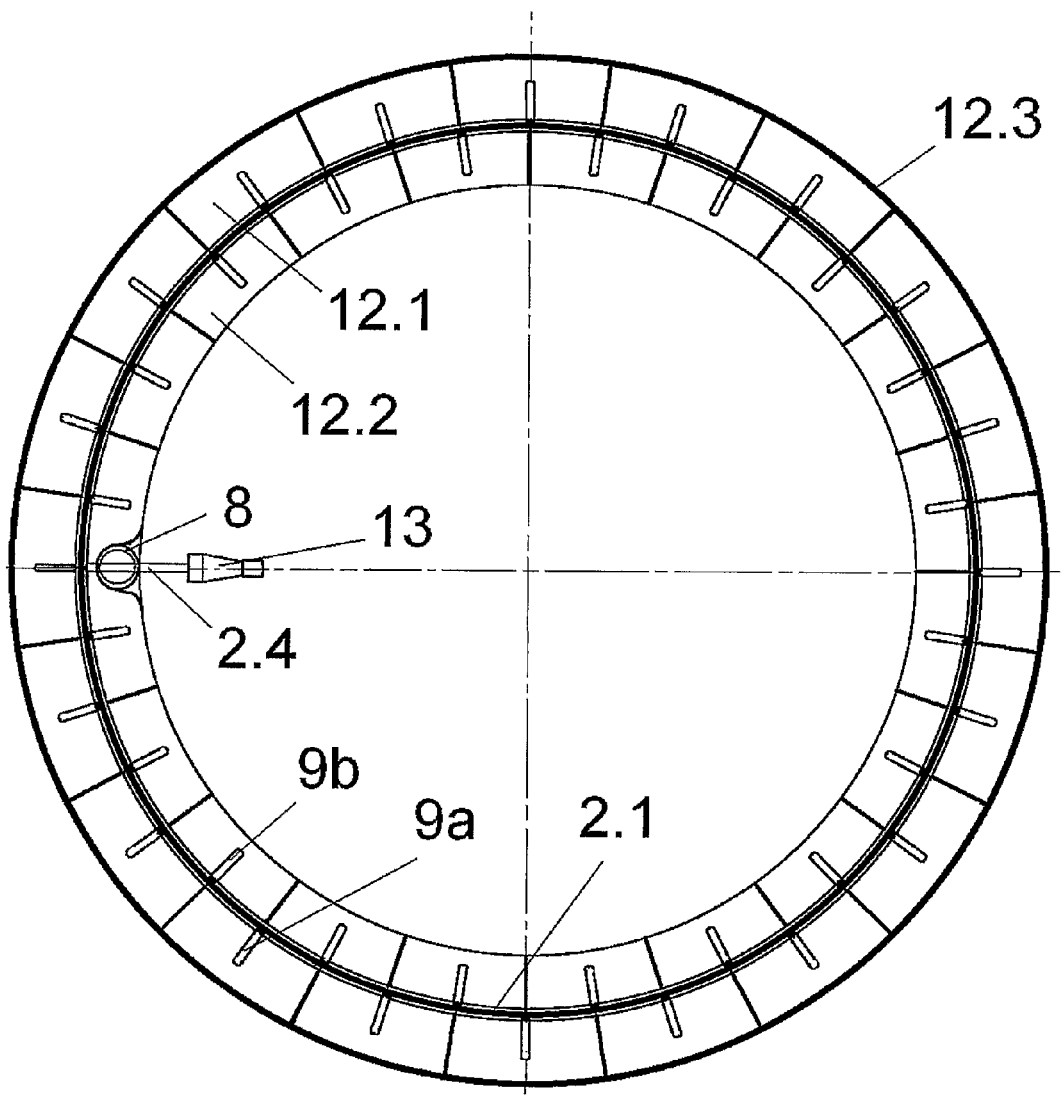

FIG. 11: The ring (12) represented with its lower chambers or lower cells (12.2), and its upper chambers (12.1) the reinforcing wires (12.3) the lower chambers valves (9b) and outside/upper chambers valves (9a), the main cord (2.1) feeding branch (2.4) air inlet valve (13) and drain pipe (8).

Sheet No 11: Mono Chamber Ring According to Arrangement No 9.

Figure 12:
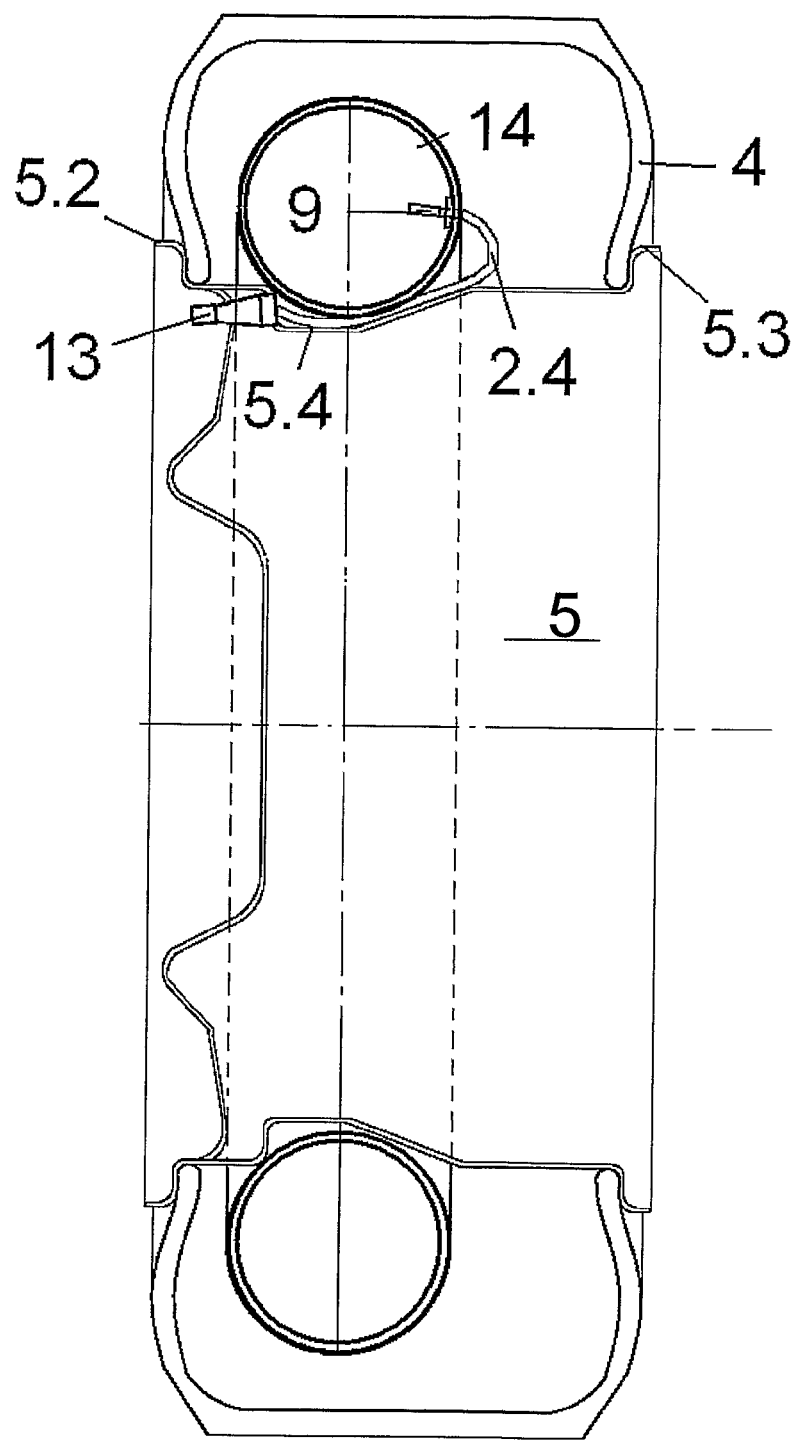

FIG. 12: Sectional view in a radial plane of the ring (14) mounted around the rim groove (5.4). A feeding branch/connector (2.4) brings the air pumped into the inlet connector (13.2) of the two entries inflation valve (13) to the ring valve (9). The tire (4) beads are pushed against the outside rim edge (5.2) and the inside one (5.3).

Sheet No 12: a Double Mono Chamber Ring According to Arrangement No 9.

Figure 13:
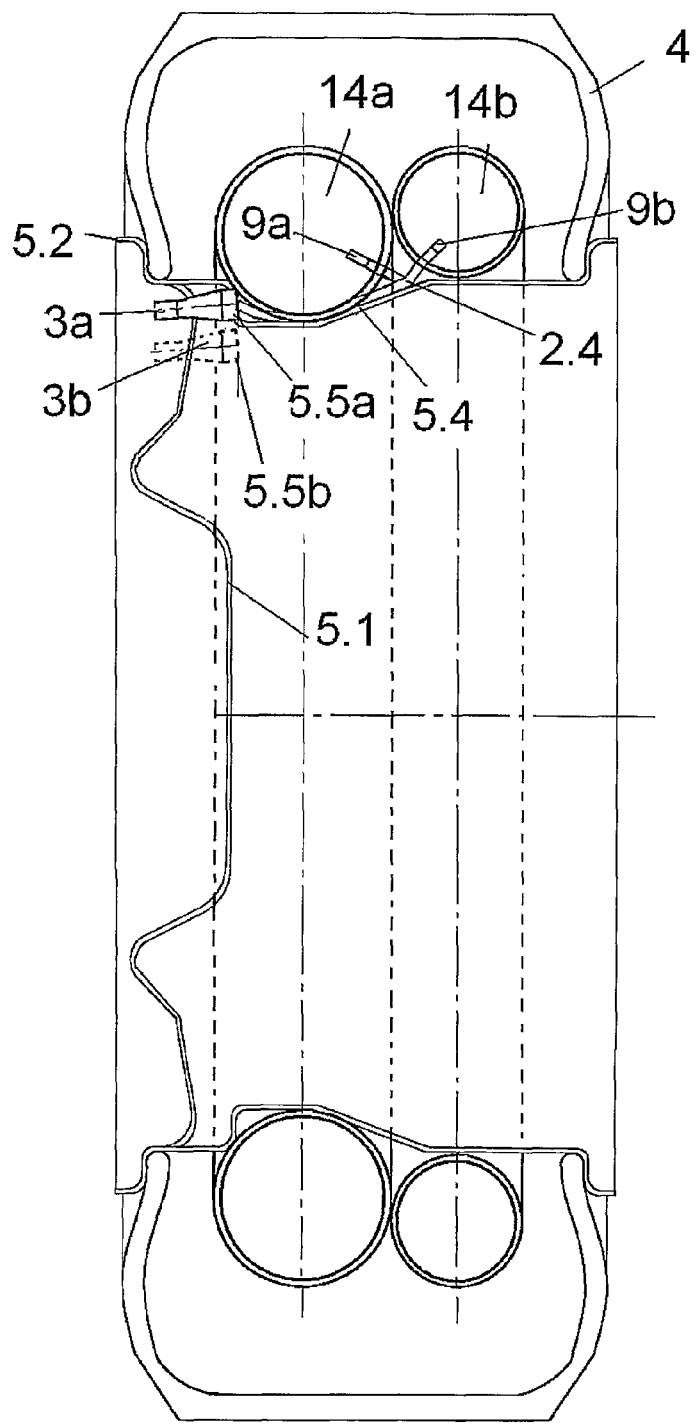

FIG. 13: sectional view in a radial plane of the rings (14a and 14b) mounted around the rim groove (5.4), a feeding/capillary branch (2.4) brings the air pumped into the valve (3a) fitted in the rim hole (5.5) to the ring valves (9a and 9b). The tire (4) beads are pushed against the outside rim edge (5.2) and the inside rim edge (5.3). The tire (4) inflation valve (3b) is fitted in a second rim hole (5.5b).

Sheet No 13: Machine for the Dismantling of the Systems.

Figure 14:
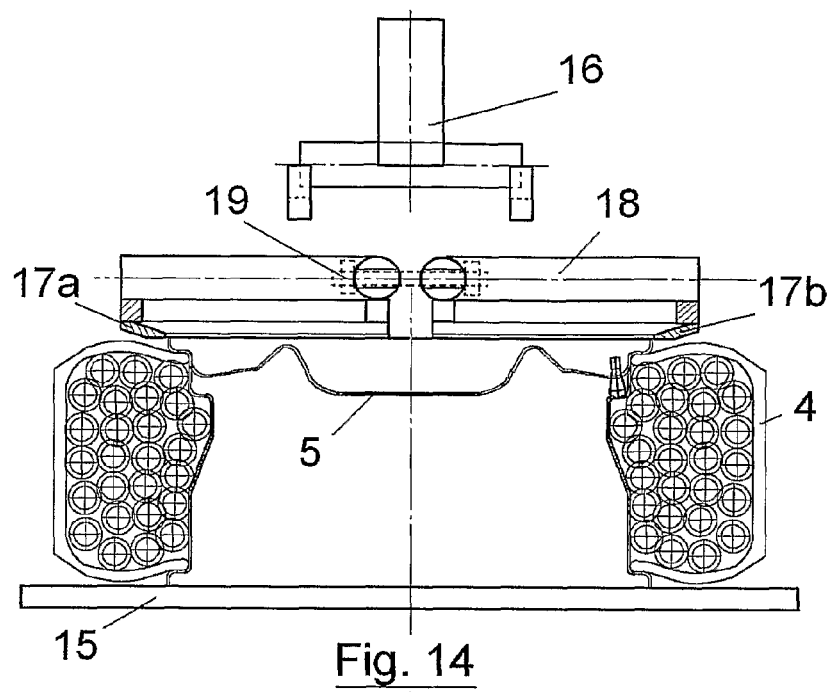

FIG. 14: sectional view of the set wheel with tire (4) and rim (5) resting on its inside face on the circular flange (15). The half jaws (17a and 17b) via their stiffeners (18) will be pushed down by the press (16) against the upper tire bead (4) and at the same time brought together by their locking system (19). The thrust stroke goes lightly beyond the rim groove upper shoulder.

Figure 15:
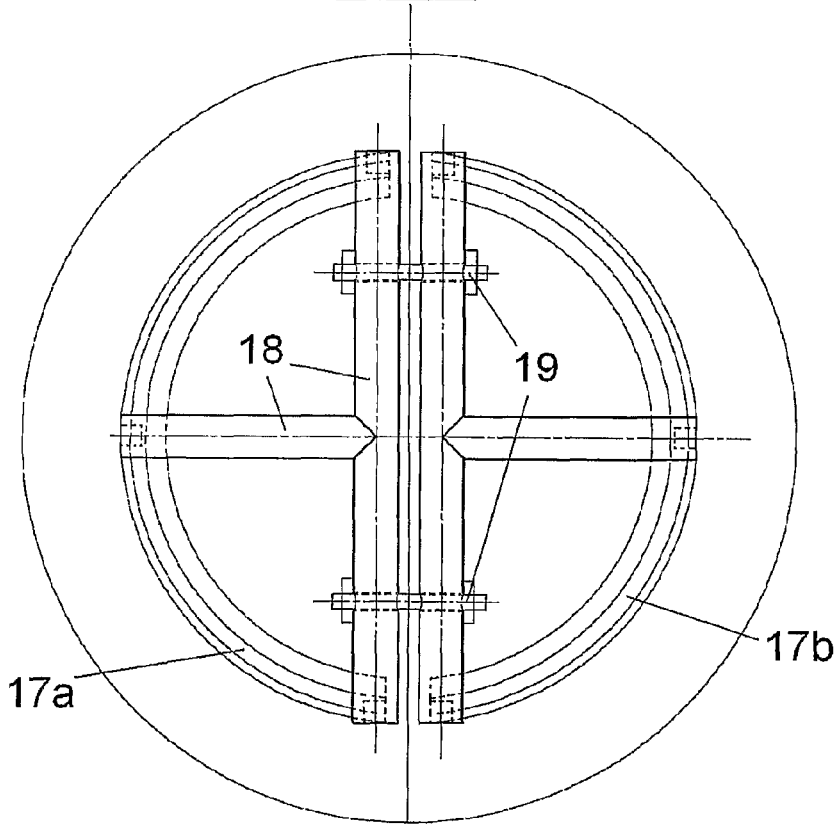

FIG. 15: top view of the set without the press and without the wheel. Half jaws (17a and 17b), stiffeners (18), locking system (19) and flange (15).

PARTS LIST

Figure 1:
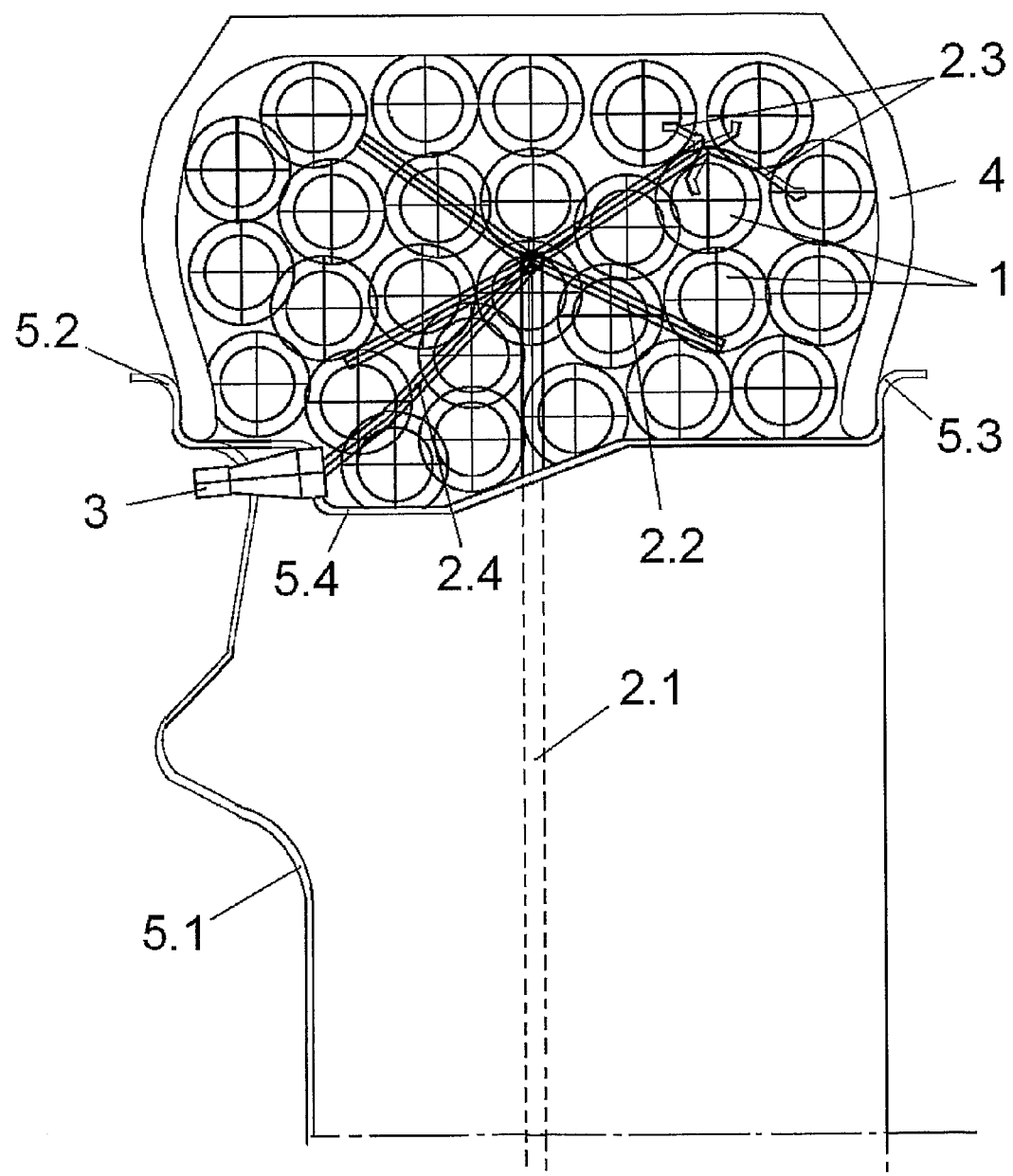
FIG. 1: The bladders (1), inside the annular inside space of the tire (4), are fed through the cord (2), with the primary cord (2.1) and distribution branches (2.2 and 2.3). The cord is inflated through the valve (3) fitted at the extremity of the feeding branch (2.4). The rim (5) consists of the web (5.1) the outside rim edge (5.2) the inside rim edge (5.3) and rim cylinder with its groove (5.4).

1: bladders (FIGS. 1 and 4)
2: inflating gas distribution cord (FIG. 1,3,5,6,9,11)
2.1: main cord (FIG. 1,3,5,6,9,11)
2.2: primary distribution branches (FIG. 1,3,5)
2.3: secondary or end distribution branches (FIG. 1,3,4)
2.4: cord feeding branch (FIG. 1, 3, 5, 6, 9, 11, 12, 13)
3: simple inflation valve (FIG. 1,3,5,6,7,11,12)
3a: ring inflation valve (FIG. 13)
3b: tire inflation valve (FIG. 13)
4: tire (FIG. 1,2,7,9,12,13,14)
5: wheel rim (FIG. 1,2,6,7,9,12,13,14)
5.1: rim web (FIG. 1,7,13,14)
5.2: outside rim edge (FIG. 1,2,6,7,9,12,13)
5.3: inside rim edge (FIG. 1,7,12)
5.4: rim groove (FIG. 1, 2, 6, 7, 9, 12, 13)
5.5: rim hole for inflation valve 3 or 13 (FIG. 6,7,9)
5.5a: first rim hole for ring/bladder inflation valve (FIG. 13)
5.5b: second rim hole for tire inflation valve 3b (FIG. 13)

5.6: venting hole (here tapped in the rim for screwing the venting plug) (FIG. 2)
6: venting flat pipe (FIG. 2)
7: purge or vent screw (FIG. 2)
8: drain pipe (FIG. 2,9,11)
9: individual bladder valves (balls, segments, rings) (FIG. 4,5,6,12)
9a: upper/outside ring chamber valves (FIG. 10,11,13)
9b: lower/inside rig chamber valves (FIG. 10,11,13)
9.1: valve main blind tube (FIG. 4)
9.2: valve hole (FIG. 4)
9.3: thin butyl wall "sock" (FIG. 4)
9.4: bottom part of the valve tube (FIG. 4)
9.5: elastic sandwich flanges (FIG. 4)
9.6: elbow or "T" shaped connector (FIG. 4)
10: segment shaped bladders (FIG. 5,6)
11: ball shaped bladders (FIG. 7)
11.1: outside wall or membrane of ball (FIG. 7)
11.2: inside reinforcement structure of ball (FIG. 8)
12: ring (FIG. 9)
12.1: ring upper/outer chambers (FIG. 9,11)
12.2: ring lower/inner chambers (FIG. 9,11)
12.3: ring reinforcing wires (FIG. 9,11)
13: double entry inflation valve (FIG. 10,11,12)
13.1: tire inflation inlet connection (FIG. 10)
13.2 ring inflation inlet connection (FIG. 10)
13.3: rubber part cast around the valve fittings (FIG. 10)
13.4: groove for the airtight passage through the rim hole (FIG. 10)
14: mono chamber ring (FIG. 12)
14a: outside mono chamber ring (FIG. 13)
14b: inside mono chamber ring (FIG. 13)
15: resting circular flange of the dismantling system (FIG. 14, 15)
16: dismantling system press (FIG. 14)
17a et 17b: half jaws for pushing on the tire beads (FIG. 14, 15)
18: dismantling system stiffeners (FIG. 14, 15)
19: dismantling system half jaws locking system (FIG. 14,15)
20: conditioning, drainage and supporting net (FIG. 7)

BEST MODE FOR CARRYING OUT THE INVENTION

The realisation of the different characteristics of the invention is done according to instructions included in each chapter.

A typical realisation for a car would require the use of a cluster made butyl of bladders with a 55 millimeter diameter and 1 millimeter thickness, valves parts made of polyethylene with a butyl made sock and a connecting cord for 192 bladders. The rim will be drilled with a hole for the inflation valve installation and with a 4 mm tapered hole with vent screw and small drain pipe located opposite to inflation valve passage hole. The whole set of bladders and cord is held in a net made of nylon link fibres knotted together to form a 10 mm mesh. The bladders are reinforced by canvas with zigzagging nylon threads. The inflation pressure of the bladders is 2.1 bars. Possible Industrial Applications.

The invention increases the tire reliability regarding puncture risks, and prevents loss of control of the vehicle and potential accidents. It is possible not to change the wheel immediately after the puncture (driver not wearing suitable clothing, dirty hands, lack of time, dangerous conflict location, unavailability of required spot to stop the car) and to lower replacement costs since the tire need not be systematically replaced. It also avoids the need to store a spare tire in the trunk. It can be essentially used for cars, trucks, race cars, emergency vehicles, police cars, farm vehicles, construction site engines, even airplanes . . . .

It increases the driving safety of trucks and tankers used for inflammable or explosive cargo. Autonomy is increased since heavy intervention is not needed in case of a puncture.

It also helps dissuade attacks on money transport armoured vans.

The invention claimed is:

1. Unpuncturable inner tube for a wheel equipped with any type of pneumatic tire characterized in that it consists in:
    a/ a cluster of independent gas tight rubber bladders (1), all identical, and of an initial diameter varying from 1 inch to a few inches,
    said bladders being each fitted with a sensitive mini inlet non return valve (9) going tightly through its wall and being fed by a connector (9.6),
    b/ an inflating gas distribution cord (2) made of hollow small diameter flexible piping and composed of a main cord (2.1) pneumatically connected on one side to an inflation valve (3) via a cord feeding branch (2.4), and feeding along its circular path a plurality of primary distribution branches (2.2) radlaly connected to it,
    said primary distributions branches feeding each a plurality of secondary distribution branches (2.3) in turn connected on their free end via said connectors (9.6) to said bladders in a quantity according to tire characteristics,
    c/ a venting system (6 or 7 and 8),
    d/ a conditioning net (20) made up of a fibre mesh of about 1 centimeters by 1 centimeters, and connected by knots, said net enclosing loosely said gas distribution cord fitted with said clusters of bladders and being sized to fill entirely the tire cavity after inflation of said bladders.

2. Unpuncturabie inner tube for a wheel equipped with any type of pneumatic tire characterized in that it consists in:
    a/ a plurality of totally independent gas tight balls (11), loose and not linked by an air distribution cord, all identical and of an initial diameter varying from 1inch to a few inches depending on the size of the tire they fit in, each of said balls
        having a wall of a semi rigid reinforced structure with a canvas built around its rubber membrane in a right angle bi directional pattern and made of zigzagging threads that allows said bails to expand under positive pressure and also to withstand without collapsing a vacuum of a few grams per square centimeter as compared to the surrounding atmosphere
        being fitted with a sensitive mini inlet non return valve (9) passing tightly through its wall, said mini inlet non return valve preventing the air present inside said ball from escaping, and letting air from surrounding atmosphere enter said ball before collapsing vacuum pressure is reached,
    b/ a venting system (6 or 7 and 8).

3. Unpuncturable inner tube according to claim 2 characterized in that it includes a net (20) with mesh of about 1centimeter by 1centimeter, made of porous fibers connected by knots, said net being sized to fit the inside cavity of the tire and to be filled with and contain said independent balls (11) in a quantity adjusted to the tire characteristics in such a way that the tire is initially filled to around 80% of its total volume by the initial volume of said balls and filled to 100% by final volume of said balls after inflation.

4. Unpuncturable inner tube according to claim 1 or 2 characterized in that:
    Said independent bladders (1 or 11) are reinforced with a covering of their rubber membrane by a canvas, the weaving of said canvas following a right angle bi directional pattern and being made with zigzagging threads, allowing the bladders to easily increase in volume until a limit.

5. Unpuncturable inner tube according to claim 1 or 2 characterized in that:

said mini non return valve (9) is made of a butyl sock (9.3) fitted on a blind tube (9.1) drilled with a small lateral hole (9.2) and closed at its blind extremity by a plug (9.4).

6. Unpuncturable inner tube according to claim 1 or 2 characterized in that:

Said mini non return valves (9) being made of a butyl sock (9.3) fitted on a blind tube (9.1) drilled with a small lateral hole (9.2) and closed at its blind extremity by a plug (9.4) made of pre-stressed rubber and being such that it can be pierced by a syringe needle and become tight again after removal of the needle.

7. Unpuncturable inner tube according to claim 1 or 2 characterized in that:

said mini non return valves (9) being made of a butyl sock (9.3) fitted on a blind tube (9.1) drilled with a small lateral hole (9.2) and closed at its blind extremity by a plug (9.4) made of a fuse type element that dissolves when in contact with a solvent.

8. Unpuncturable inner tube for a wheel equipped with any type of pneumatic tire characterized in that it consists in:

a/ a plurality of independent gas tight rubber balls (11) being all identical and of an initial diameter varying from 1 inch to a few inches, having a semi rigid structure reinforced by a canvas covering their rubber membrane in a right angle bi directional pattern and being made with zigzagging threads, said balls being able to expend easily until a limit under positive pressure and to withstand without collapsing a negative pressure of a few grams per square centimeter, being each fitted with a sensitive mini inlet non return valve (9) going tightly through its wall and being open on the outside and letting air in said ball for a pressure lower than its collapsing pressure, said mini non return valves (9) being made of a butyl sock (9.3) fitted on a blind tube (9.1) drilled with a small lateral hole (9.2) and closed at its blind extremity by a plug (9.4) made of a fuse type element that dissolves when in contact with a solvent, b/ a venting system (6 or 7 an 8), c/ a net (20) made up of a fiber mesh of about 1 centimeter by 1 centimeter, and connected by knots; said net being sized to fit the inside cavity of the tire and to be filled with and contain said independent balls (11) in a quantity adjusted to the tire characteristics.

9. Unpuncturable inner tube according to claim 1 or 2 or 8 characterized in that:

said venting system is a flat pipe (6) with an "S" shape.

10. Unpuncturable inner tube according to claim 1 or 2 or 8 characterized in that:

said venting system consists of a venting cap (7) and a drain pipe (8).

11. Unpuncturable inner tube for a wheel equipped with any type of pneumatic tire characterized in that it consists in:

a/ at least one ring (12), each said ring being made of an outside ring (12.1) and of an inside ring (12.2) resting on the groove of the wheel rim, occupying only part of the tire cavity, and being made of a rubber type material with reinforcement wires (12.3) and bandages that contain its volume expansion, each of its said outside and inside rings including a plurality of almost equal length gas tight bladders, the ones of said inside ring being slightly shorter, that constitute its aligned partitioned chambers, said partitioned chambers of said outside ring being in a staggered arrangement as compared to said partition chambers of said inside ring, each bladder being fitted with a valve (9a and 9b) and being connected to the others by a cord (2.1) fed with air compressed air at its extremity, b/ an inflation valve (3a or 13.2) being connected to the extremity of said cord (2.1) and feeding it with compressed air, c/ a small drain pipe (8) being located in front of this valve in order to avoid plugging by the rings.

* * * * *